United States Patent
Issartel et al.

(10) Patent No.: US 10,202,944 B2
(45) Date of Patent: Feb. 12, 2019

(54) METHOD FOR DIAGNOSING THE OPERATION OF THE PURGING OF A CANISTER

(71) Applicant: RENAULT s.a.s., Boulogne Billancourt (FR)

(72) Inventors: David Issartel, Chauffour les Etrechy (FR); Cedric Harter, Etampes (FR)

(73) Assignee: RENAULT s.a.s., Boulogne Billancourt (FR)

( * ) Notice: Subject to any disclaimer, the term of this patent is extended or adjusted under 35 U.S.C. 154(b) by 94 days.

(21) Appl. No.: 15/520,014

(22) PCT Filed: Oct. 23, 2015

(86) PCT No.: PCT/FR2015/052858
§ 371 (c)(1),
(2) Date: Apr. 18, 2017

(87) PCT Pub. No.: WO2016/066937
PCT Pub. Date: May 6, 2016

(65) Prior Publication Data
US 2017/0335803 A1    Nov. 23, 2017

(30) Foreign Application Priority Data
Oct. 31, 2014   (FR) .................................... 14 60526

(51) Int. Cl.
*G06F 11/30* (2006.01)
*F02M 25/08* (2006.01)
(Continued)

(52) U.S. Cl.
CPC ..... *F02M 25/0827* (2013.01); *F02D 41/0035* (2013.01); *F02M 25/089* (2013.01);
(Continued)

(58) Field of Classification Search
CPC combination set(s) only.
See application file for complete search history.

(56) References Cited

U.S. PATENT DOCUMENTS

| | | |
|---|---|---|
| 5,592,923 A | 1/1997 | Machida |
| 2010/0305828 A1 | 12/2010 | Kuentzle et al. |

(Continued)

FOREIGN PATENT DOCUMENTS

| | | |
|---|---|---|
| DE | 10 2009 002 746 A1 | 11/2010 |
| EP | 1 013 917 A2 | 6/2000 |

(Continued)

OTHER PUBLICATIONS

International Search Report dated Feb. 12, 2016 in PCT/FR2015/052858 Filed Oct. 23, 2015.

(Continued)

*Primary Examiner* — Phuong Huynh
(74) *Attorney, Agent, or Firm* — Oblon, McClelland, Maier & Neustadt, L.L.P.

(57) ABSTRACT

A method for diagnosing operation of a valve to purge a canister of an internal combustion engine, the method, carried out during a purge, including: a) detecting, at an instant t0, that the purge valve is open; b) executing a forced closing of the valve at an instant t2; c) measuring a pressure $P1m$ of the intake manifold and calculating a corresponding modelled pressure $P1c$, at an instant t1 between the instant t0 and the instant t2; d) measuring a pressure of the manifold $P2m$ and calculating a corresponding modelled pressure $P2c$, at an instant t3 after the instant t2; e) calculating a deviation $E1$ between $P1m$ and $P1c$ and calculating a deviation $E2$ between $P2m$ and $P2c$; f) calculating a criterion $C=E1-E2$; and g) diagnosing malfunction of the purge valve if the criterion C is lower than a predetermined threshold value Cs.

13 Claims, 1 Drawing Sheet

(51) Int. Cl.
*F02D 41/00* (2006.01)
*G01L 13/00* (2006.01)

(52) U.S. Cl.
CPC ......... *F02M 25/0836* (2013.01); *G01L 13/00* (2013.01); *F02D 41/004* (2013.01); *F02D 2200/0406* (2013.01)

(56) References Cited

U.S. PATENT DOCUMENTS

2013/0282230 A1* 10/2013 Sager ................. F02B 29/0406
 701/33.6
2014/0345574 A1 11/2014 Haefele
2014/0365071 A1 12/2014 Sager et al.

FOREIGN PATENT DOCUMENTS

| EP | 1013917 | * | 6/2000 |
| FR | 2 989 166 A3 | | 10/2013 |
| FR | 2989166 | * | 10/2013 |
| WO | 2013/053574 A2 | | 4/2013 |

OTHER PUBLICATIONS

French Search Report dated Mar. 4, 2015 in French Application No. 1460526 Filed Oct. 31, 2014.

\* cited by examiner

METHOD FOR DIAGNOSING THE OPERATION OF THE PURGING OF A CANISTER

The present invention relates to a method for diagnosing the operation of the purge valve of a fuel vapor filter of an internal combustion-engined vehicle. The invention also relates to the engine implementing this method.

Pollution control standards currently stipulate that vehicles must be equipped with means permitting the diagnosis of the operation of the purging of the fuel vapor filter.

A suchlike filter, also referred to as a "canister", is mounted on a vehicle containing an internal combustion engine and a reservoir for fuel, such as petrol, in order to prevent any vapors emerging from this reservoir from being discharged into the atmosphere. It is regularly purged in the course of a journey and in an automatic manner. This purging takes place by establishing a circuit between an air inlet into a reserve chamber of the filter and the intake manifold of the engine, in order for the vapors to be burned in the combustion chambers along with the fuel. A purge valve is mounted on a pipe connecting the filter to the intake manifold. During normal operation, the purge valve, controlled by a control unit of the engine, opens progressively at the start of the purge, remains open until the end of the purge, and then recloses likewise progressively. The opening is progressive in order for the operating parameters of the engine to have the time to adapt to this additional arrival of fuel and air.

When this purge valve remains open, does not close again or closes again only partially, this is referred to as a malfunction.

In order to detect such malfunctions, the methods of the prior art test the operation of the purge valve when the vehicle is in idling mode.

One of the methods for diagnosing involves observing the operation of the engine during opening of the purge valve. By way of example, document FR 2 900 982 A1 proposes to perform a purge of the canister when the engine is idling, and to observe the behavior of an idling speed controller, for example based on a controller of the PID (Proportional Integral Derivative) type. A comparison of the parameters of the controller before the purge and after the purge makes it possible to diagnose whether the opening of the purge valve has or has not taken place.

Suchlike methods are not applicable, however, in the case of vehicles equipped with automatic stop and start functions (Start & Stop). The idling phases are virtually non-existent, in fact, in vehicles of this kind. It is therefore becoming necessary to develop new methods which operate outside the idling speed.

In order to respond to this need, the present invention proposes a method for diagnosing the operation of the purge valve of a canister which operates both at the idling speed and outside the idling speed.

The invention relates to a method for diagnosing the operation of the purge valve for a fuel vapor filter of an internal combustion engine, the purge valve establishing a fluidic communication on request between a reserve chamber of the filter and an intake manifold of the engine, said method, carried out in the course of a purge, being characterized in that it comprises the following steps:

a) detecting, at an instant t0, a certain level of opening of said purge valve, established beforehand, on the basis of which said purge valve is considered to be sufficiently open;

b) executing a forced and instantaneous closing of said purge valve, at an instant t2;

c) measuring a first pressure $P1m$ of the manifold, prevailing in the interior of the intake manifold, and calculating a first modeled value $P1c$ for said pressure of the manifold according to the operating point of the engine, at an instant t1 between the instant t0 the instant t2;

d) measuring a second pressure of the manifold $P2m$ and calculating a second modeled value $P2c$ for said pressure of the manifold according to the operating point of the engine, at an instant t3 after the instant t2;

e) calculating a first deviation E1 between the measured pressure $P1m$ and the calculated pressure $P1c$ and calculating a second deviation E2 between the measured pressure $P2m$ and the calculated pressure $P2c$;

f) calculating a criterion C corresponding to the difference between the first deviation E1 and the second deviation E2;

g) diagnosing the malfunction of said purge valve if the criterion C is lower than a predetermined threshold value Cs.

Thus, the implementation of the diagnosis of the operation of the purge valve, according to the invention, is not limited to the idling phases and may be achieved at any moment when a purge is initiated. In fact, since the method is based on the modeling of the manifold pressure, it is possible to measure the prevailing pressure inside the intake manifold at any time and to compare it with a modeled pressure, obtained at the same time, which corresponds theoretically to the prevailing pressure inside the intake manifold outside the purging phases. The variation in the measured pressure in relation to the modeled pressure thus makes it possible to provide information about the opening and the closing of the purge valve.

This method is simple and does not require specific means for its implementation, other than a program, for example in the control unit for the engine. It is sufficient to detect that a purge phase is in progress, to measure the manifold pressure and, at the same time, to determine the value of the modeled pressure, and then to order a forced and instantaneous closing of said purge valve. After this closing, it is likewise necessary to measure the manifold pressure and, at the same time, to determine the value of the modeled pressure. A comparison of the deviation between the value of the measured pressure and the modeled pressure, before and after the instantaneous closing, permits any malfunction to be detected. In fact, in the case of normal operation of this purge valve, a sharp fall in the manifold pressure should follow this instantaneous closing. However, this would result in the fact that the criterion calculated by the formula $C=E1-E2$, where $E1=E1m-E1c$ and $E2=E2m-E2c$, will be high. Conversely, in the case of a valve which does not operate correctly, that is to say which is blocked in an opening or closing position, this criterion will be low because the values of E1 and E2 will be close.

The implementation of the method does not require the installation of specific means of measurement, since a sensor permitting the measurement of the pressure inside the intake manifold is already currently available on internal combustion engines. The modeling is undertaken on the basis of conventional parameters such as, for example, without limitation, the speed of the engine, the degree of opening of a butterfly valve, the temperature of the engine, and the atmospheric pressure. In order to identify a variation in pressure due to the purge flow rate thereof caused by a change in the operating point of the engine, the model does not take into account the purge flow rate and, as a result, varies only according to the operating point of the engine.

In addition, the calculation of a difference between the deviations E1 and E2 makes it possible not to take into account a systematic deviation between the measured pressure and the modeled pressure. In fact, the systematic deviation being constant, the provision of a difference between the deviations cancels out the effect of the systematic deviation.

According to one embodiment, the level of opening from which the purge valve is considered to be sufficiently open is greater than or equal to 70% opening of said purge valve. This condition makes it possible to ensure the reliability of the measurement. In fact, the greater the level of opening of the valve, the more accurate the criterion C will be. This is explained by the fact that the flow of air and fuel vapors arriving in the intake manifold increases with the increase in the level of opening of the purge valve. As a result, the deviation between the measured pressure before the instantaneous closing and that measured after this instantaneous closing is greater. The value of the modeled pressure is independent of this level of opening, since the model varies only according to the operating point of the engine.

In addition, in order not to restrict the number of diagnoses performed in the course of a journey, it is recommended that the level of opening from which the purge valve is considered to be sufficiently open should be less than 90% opening of said purge valve.

According to a preferred embodiment, the deviation between the instant t0 and the instant t1 corresponds to a stabilization time for the manifold pressure. Thus, as soon as the opening of the purge valve is detected, at the instant to, a brief delay will be initiated until the instant t1 in order to permit the stabilization of the manifold pressure, whereupon the actual pressure P1$m$ is measured and the corresponding modeled pressure P1$c$ is calculated. This stabilization will permit, in particular, a more accurate value for P1$m$ to be obtained.

Advantageously, this time between the instant t0 and the instant t1 lies between 1 s and 3 s.

According to a preferred embodiment, the deviation between the instant t2 and the instant t3 corresponds to a stabilization time for the manifold pressure following the forced and instantaneous closing. Thus, as soon as the forced and instantaneous closing has taken place, at the instant t2, a brief delay is initiated until the instant t3 in order to permit the stabilization of the manifold pressure, whereupon the actual pressure P2$m$ is measured and the corresponding modeled pressure P2$c$ is calculated. This stabilization will permit, in particular, a more accurate value for P2$m$ to be obtained.

Advantageously, this time between the instant t2 and the instant t3 lies between 0.5 s and 2 s.

According to one embodiment, between the instant t0 and the instant t1, it is verified that the manifold pressure is lower than a previously determined maximum value Pmax, for example 800 hPa. It is likewise verified that the operating point of the engine is stable, by ensuring that the variation in the manifold pressure is lower than a previously determined maximum value, for example 20 hPa/s, as an absolute value.

According to another embodiment the instant t2 and the instant t3, it is also verified that the manifold pressure is lower than a previously determined maximum value Pmax and that the operating point of the engine is stable. If the variation in pressure between the instant t2 and the instant t3 exceeds a pre-established threshold, in the order of 100 hPa, the diagnosis is stopped because it is at risk of being compromised.

Preferentially, the instant t1 is equal to the instant t2, the forced and instantaneous closing of the purge valve being executed just after the recording of the measured pressure P1$m$ and the calculated pressure P1$c$. The fact of initiating the instantaneous closing just after the measurement of the pressure P1$m$ and the calculation of the pressure P1$c$ makes it possible to reduce the time necessary for a diagnosis. The number of diagnoses possible in the course of the same purge increases as a consequence of this. This is explained by the fact that, during the instantaneous closing of the purge valve, if the control unit of the engine the purge detects that the duration of the purge was not sufficient, said purge valve will reopen automatically.

According to an improved embodiment, the steps a) to g) are repeated at least once, and a malfunction of the purge valve is concluded to exist if the criterion C on each occasion is lower than the threshold value Cs. This makes it possible to impart greater reliability to the diagnosis and limits the risks of raising false alarms. For example, if the first implementation of the diagnosis detects a malfunction, steps a) to g) are repeated a predetermined number of times, for example between 2 and 4. If, and only if, the result is the same on each occasion that these steps are repeated, the malfunctioning of the purge valve is concluded to exist.

According to another improved embodiment, the modeled pressure includes a theoretical part and a corrective part, this corrective part being determined by a learning process according to the deviation between the theoretical part and the pressure measured outside the purge phases. This learning process makes it possible to take into account systematic variabilities in relation to the theoretical model of the operation of the engine. These variabilities derive, for example, from machining inaccuracies, from the replacement of a sensor or from contamination. The corrective part is determined either globally or, preferentially, depending on at least certain parameters characterizing the operating point of the engine.

The invention also has as its object an internal combustion engine containing an intake manifold, a fuel vapor filter, a purge valve establishing a fluidic communication on request between a reserve chamber of the filter and of the engine, means of measuring a manifold pressure prevailing in the interior of the intake manifold, said engine being characterized in that it implements a method as described previously.

The invention will be more easily understood, and other features and advantages will be appreciated from a perusal of the following description with reference to the drawings, in which.

Figure 1:
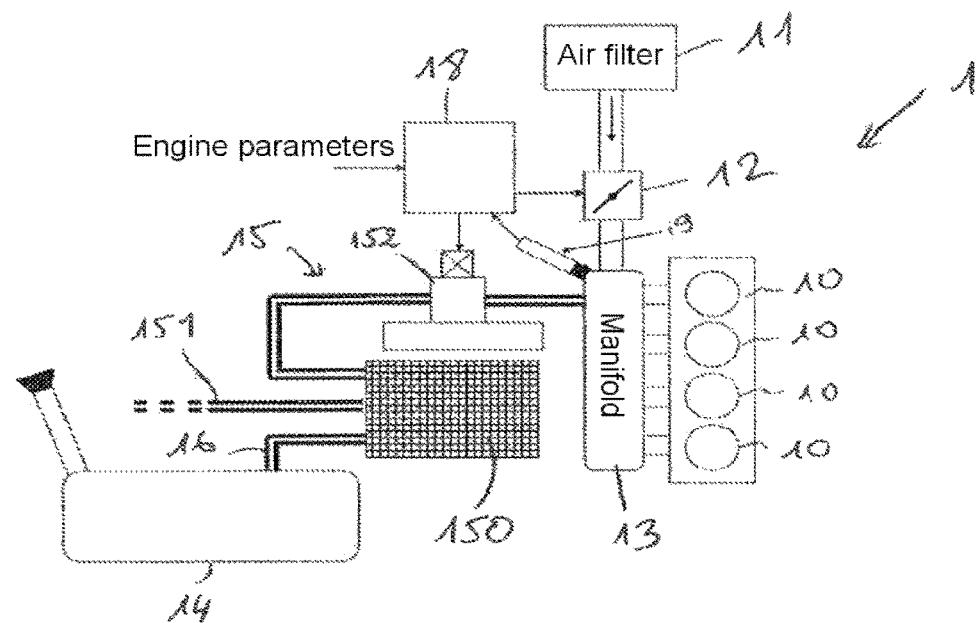
FIG. 1 is a schematic view of an internal combustion engine containing a fuel vapor filter implementing a method for diagnosing according to the invention.

The internal combustion engine 1 as represented in FIG. 1 is of the positive-ignition type. It contains a series of combustion chambers 10 supplied with a mixture of air and fuel through an air filter 11, followed by a butterfly valve 12 and by an intake manifold 13. Other functional elements of the engine 1 are without relevance to the invention and are not represented here.

The engine 1 includes in addition a reservoir 14 for fuel and a filter for fuel vapors 15. The filter for fuel vapors 15 contains a reserve chamber 150, which is connected via a first pipe 16 to the upper part of the reservoir 14. The reserve chamber 150 is likewise connected to an air intake 151 and to the intake manifold 13 by means of a second pipe 17 and a purge valve 152.

The engine 1 includes a control unit 18 which is, for example, an electronic microprocessor card. A suchlike control unit 18 is conventional and is not described in detail here.

The control unit 18 receives information from sensors positioned on the engine 1, in particular with a sensor for the speed of rotation of the engine crankshaft, temperature sensors, an oxygen probe, which are not represented here, and a pressure sensor 19 for measuring the pressure inside the intake manifold 13.

The control unit 18 likewise controls the purge valve 152. When a purge is controlled and lies outside the implementation of the diagnostic method according to the invention, the purge valve 152 opens progressively until it is completely open. It is kept open for a certain time and is then reclosed, likewise progressively. When the valve is open, a gas flow is established between the air intake 151 and the intake manifold 13, such that the fuel vapors contained in the reserve chamber 150 are carried towards the intake manifold 13 and are burned in the combustion chambers 10.

Figure 2:
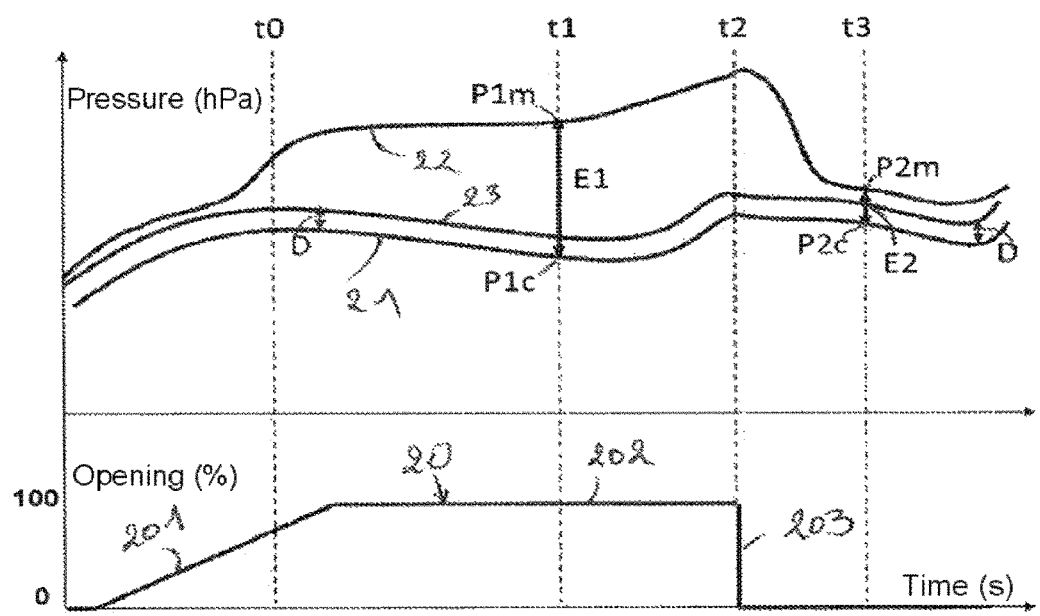
FIG. 2 is a time diagram showing the development of the manifold pressure, measured and modeled in the course of a purge with forced closing according to a preferred embodiment of the method.

FIG. 2 shows the position of the purge valve 152, as a percentage of its opening, in the course of the implementation of the method according to the invention during a purge phase, as the curve 20. The change in the position of this purge valve 152 includes a phase 201 of progressive opening until total opening, a phase 202 of maintaining in the open position and an instantaneous closing 203.

During this change in the position of the purge valve 152, the control unit 18 determines a modeled pressure, which corresponds theoretically to the pressure inside the intake manifold 13 outside the purge phases. The modeled pressure is represented by the curve 21 in FIG. 2. The modeled pressure contains a theoretical part and corrective part, obtained by a learning process outside the purge periods. At the same time, the pressure sensor 19 measures the pressure inside the intake manifold 13. The result of this measurement is indicated by the curve 22 in FIG. 2.

When the purge valve 152 is blocked, the pressure measured inside the intake manifold does not change in the same way. The curve 23 represents the change in the measured pressure when the purge valve 152 is blocked in the closed position. In this case, the pressure inside the intake manifold 13 remains very close to the modeled pressure. A deviation D may exist between the modeled pressure and the measured pressure, although this deviation is substantially constant.

In order to perform a diagnosis according to the invention, the control unit 18 detects, at an instant t0, that the purge valve is open when the opening thereof reaches a certain percentage of opening beyond which the opening is considered to be sufficient. This percentage opening is preferably between 70% and 90% opening. This will make it possible both to have an accurate measurement of P1$m$ and not to limit the number of possible diagnoses in the course of a single purge.

A first delay is then initiated in order to permit the stabilization of the pressure in the intake manifold. The duration of this delay is from is to 3 s, for example. At the end of this first delay, at the instant t1, the control unit 18 memorizes the value of the pressure P1$m$ measured inside the manifold and the calculated value P1$c$ for the modeled pressure according to the operating point of the engine 1. These two values will then serve to calculate a first deviation E1=P1$m$−P1$c$.

Forced and instantaneous closing of the purge valve 152 is subsequently performed at an instant t2 situated slightly after the instant t1, such that the control unit 18 has already memorized the pressure values P1$m$ and P1$c$ during this interval. As a variant, not represented here, the instant t2 could also be the same as the instant t1.

A second delay is initiated after this instantaneous closing of the purge valve at the instant t2, in order to permit the stabilization of the manifold pressure. The duration of this delay lies between 0.5 s and 2 s, for example. At the end of this delay, at the instant t3, the control unit 18 memorizes the value of the measured pressure P2$m$ inside the manifold and the calculated value of the modelized pressure P2$c$ according to the new operating point of the engine 1, and then calculates a second deviation E2=P2$m$−P2$c$. The control unit 18 then establishes a criterion C according to the formula:

$$C = E1 - E2,$$

and the criterion C is then compared to a predetermined threshold Cs. If the criterion C is greater than Cs, the valve has functioned correctly. Otherwise, the diagnosis is repeated one or more times. If the result remains unchanged after a certain number of times, for example between 2 and 4 times, that is to say if the criterion C on each occasion is below the threshold Cs, it is then concluded that a malfunction of the purge valve 152 has occurred. If, on the other hand, the criterion C is at least once greater than the threshold Cs, it is concluded that no malfunction has taken place.

The invention claimed is:

1. A method for diagnosing operation of a purge valve for a fuel vapor filter of an internal combustion engine, the purge valve establishing a fluidic communication on request between a reserve chamber of the filter and an intake manifold of the engine, the method, carried out in a course of a purge, comprising:
   a) detecting, at an instant t0, a certain level of opening of the purge valve, established beforehand, based on which the purge valve is considered to be sufficiently open;
   b) executing a forced and instantaneous closing of the purge valve at an instant t2;
   c) measuring a first pressure P1$m$ of the intake manifold, prevailing in an interior of the intake manifold, and calculating a first modeled value P1$c$ for the pressure of the intake manifold according to an operating point of the engine, at an instant t1 between the instant t0 the instant t2;
   d) measuring a second pressure P2$m$ of the intake manifold and calculating a second modeled value P2$c$ for the pressure of the intake manifold according to an operating point of the engine, at an instant t3 after the instant t2;
   e) calculating a first deviation E1 between the measured pressure P1$m$ and the calculated pressure P1$c$ and calculating a second deviation E2 between the measured pressure P2$m$ and the calculated pressure P2$c$;
   f) calculating a criterion corresponding to the difference between the first deviation E1 and the second deviation E2;
   g) diagnosing malfunction of the purge valve if the criterion is lower than a predetermined threshold value.

2. The method for diagnosing as claimed in claim 1, wherein the level of opening from which the purge valve is considered to be sufficiently open is greater than or equal to 70% opening of the purge valve.

3. The method for diagnosing as claimed in claim 1, wherein the level of opening from which the purge valve is considered to be sufficiently open is less than 90% opening of the purge valve.

4. The method for diagnosing as claimed in claim 1, wherein the deviation between the instant t0 and the instant t1 corresponds to a stabilization time for the manifold pressure.

5. The method for diagnosing as claimed in claim 1, wherein the time between the instant t0 and the instant t1 is between 1 s and 3 s.

6. The method for diagnosing as claimed in claim 1, wherein the deviation between the instant t2 and the instant t3 corresponds to a stabilization time for the manifold pressure following the forced and instantaneous closing.

7. The method for diagnosing as claimed in claim 1, wherein the time between the instant t2 and the instant t3 is between 0.5 s and 2 s.

8. The method for diagnosing as claimed in claim 1, wherein, between the instant t0 and the instant t1, it is verified that the manifold pressure is lower than a previously determined maximum value Pmax and that the operating point of the engine is stable.

9. The method for diagnosing as claimed in claim 1, wherein, between the instant t2 and the instant t3, it is verified that the manifold pressure is lower than a previously determined maximum value Pmax and that the operating point of the engine is stable.

10. The method for diagnosing as claimed in claim 1, wherein the instant t1 is equal to the instant t2, the forced and instantaneous closing of the purge valve being executed just after recording of the measured pressure P1$m$ and the calculated pressure P1$c$.

11. The method for diagnosing as claimed in claim 1, wherein a) to f) are repeated at least once, and a malfunction of the purge valve is concluded to exist if the criterion on each occasion is lower than the threshold value.

12. The method for diagnosing as claimed in claim 1, wherein the modeled pressure includes a theoretical part and a corrective part, the corrective part being determined by a learning process according to the deviation between the theoretical part and the pressure measured outside purge phases.

13. An internal combustion engine comprising:
an intake manifold, a fuel vapor filter, a purge valve establishing a fluidic communication on request between a reserve chamber of the filter and of the engine, means of measuring a manifold pressure prevailing in the interior of the intake manifold, the engine implementing a method as claimed in claim 1.

* * * * *